United States Patent
Knottenbelt et al.

(10) Patent No.: US 8,344,199 B2
(45) Date of Patent: Jan. 1, 2013

(54) REMOVAL OF ULTRA-FINE PARTICLES FROM A FISCHER TROPSCH STREAM

(75) Inventors: Cyril David Knottenbelt, Mossel Bay (ZA); Patrick Otto Taylor, Mossel Bay (ZA); Vernon Jeremay Adams, Mossel Bay (ZA); Volan Richard Nicholson, Mossel Bay (ZA)

(73) Assignee: The Petroleum Oil and Gas Corporation of South Africa (Pty) Ltd., Patow (ZA)

( * ) Notice: Subject to any disclaimer, the term of this patent is extended or adjusted under 35 U.S.C. 154(b) by 309 days.

(21) Appl. No.: 12/601,722

(22) PCT Filed: May 27, 2008
(Under 37 CFR 1.47)

(86) PCT No.: PCT/IB2008/052069
§ 371 (c)(1),
(2), (4) Date: Jun. 7, 2010

(87) PCT Pub. No.: WO2008/146239
PCT Pub. Date: Dec. 4, 2008

(65) Prior Publication Data
US 2010/0256433 A1    Oct. 7, 2010

(30) Foreign Application Priority Data

May 28, 2007 (ZA) ................ 2007/04341

(51) Int. Cl.
*C10G 45/14* (2006.01)

(52) U.S. Cl. ...... 585/800; 585/818; 208/950; 208/251 R
(58) Field of Classification Search ............... None
See application file for complete search history.

(56) References Cited

U.S. PATENT DOCUMENTS

| 2002/0128330 A1 | 9/2002 | Anderson | 518/722 |
| 2005/0000861 A1 | 1/2005 | Clerici et al. | 208/251 |
| 2007/0039852 A1* | 2/2007 | Khakdaman et al. | 208/33 |

FOREIGN PATENT DOCUMENTS

| WO | WO03/004582 | 1/2003 |
| WO | WO 03/089103 | 10/2003 |
| WO | WO2005/005038 | 1/2005 |

* cited by examiner

*Primary Examiner* — Tam M Nguyen
(74) *Attorney, Agent, or Firm* — Paul Davis; Goodwin Procter LLP

(57) ABSTRACT

This invention relates to a process for the removal of catalyst particles from a hydrocarbon stream (14) derived from the reaction of synthesis gas (12) with a particulate Fischer Tropsch catalyst in a Fischer Tropsch reactor (10). The process includes a primary separation step (16) which makes use of a filter, wherein the filter has a pore size which is 70% to 95 of the average size of the particles of the Fischer Tropsch catalyst, thereby forming a primary filtered hydrocarbon stream (18) containing fine catalyst particles. The benefit of this selection of filter pore size is that it mitigates fines build-up on the filter of the primary separator. The primary filtered hydrocarbon stream (18) is then passed to a secondary separation step in a cross-flow filtration unit (20) which removes fine catalyst particles from the primary filtered hydrocarbon stream to provide a retenate (24) containing the catalyst fines, and permeate (22) containing a hydrocarbon product.

13 Claims, 1 Drawing Sheet

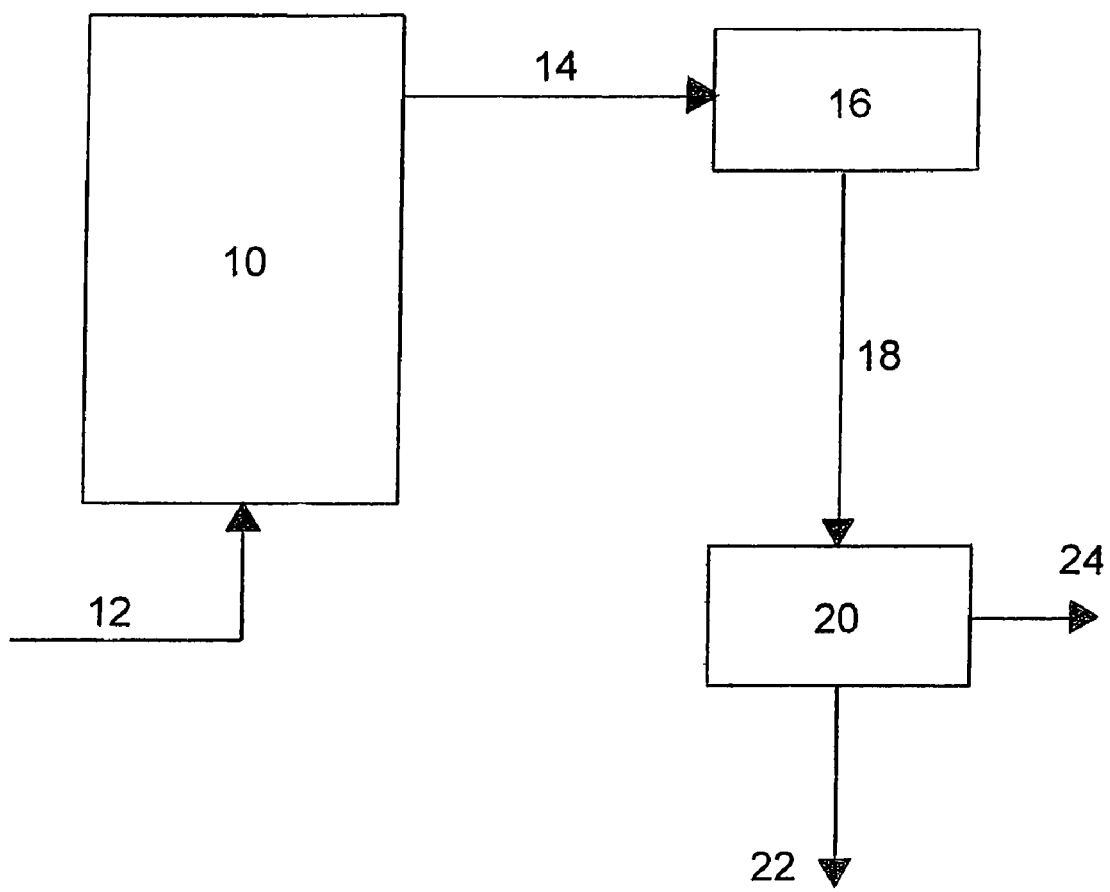

REMOVAL OF ULTRA-FINE PARTICLES FROM A FISCHER TROPSCH STREAM

BACKGROUND OF THE INVENTION

Fischer Tropsch (FT) synthesis involves the conversion of carbon monoxide and hydrogen to higher hydrocarbon products. In the case of Low Temperature Fischer Tropsch (LTFT) synthesis, wax is the penultimate product. Wax is converted by hydrocracking into shorter chains for use as high quality transportation fuels, mainly diesel fuel.

In the case of LTFT processes, the reactor is typically a Slurry Bubble Column Reactor (SBCR). Synthesis gas, a mixture of carbon monoxide and hydrogen, is bubbled through a column of liquid wherein catalyst particles are suspended in the SBCR. The catalyst suspended in the liquid column catalyses the conversion of the synthesis gas to form predominantly liquid higher hydrocarbons. These liquid hydrocarbons (wax product) are removed from the SBCR by a liquid-solid separation means, normally filtration. Filters can be placed internally within the SBCR or externally. The catalyst particle size and filter mesh size are normally carefully selected within a specific range to compliment each other to ensure that the catalyst is retained in the SBCR or can be circulated back to the SBCR in the case of externally placed filters. A further requirement is that the liquid product does not contain excessive catalyst.

Due to the extreme hydrodynamic forces within the SBCR the catalyst particles tend to undergo attrition. Attrition increases the number of fine particles (<25 microns) and reduces the average particle size. The presence of catalyst fines leads to separation difficulties, can prematurely block filters and result in catalyst breakthrough of the filters and enable catalyst to become entrained in the liquid flow. Further hydroprocessing of such particle containing higher hydrocarbons (liquid wax product) will result in premature deactivation, fouling and eventual blockage of such hydroprocessing catalysts.

As per the FT catalyst art, FT catalysts are typically supported on various refractory supports such as alumina, silica and titania. Group VIII refractory supported metals are used to catalyse the FT reaction, these include cobalt, iron, nickel and ruthenium. Promoters may be added to the catalyst and could include ruthenium, palladium or platinum, rhenium, lanthanum and zirconium.

Although hydrocracking is a well-established and widely practiced technology, the prior art relating to the clean up and removal of particulate from hydroprocessing feeds is all based on crude oil feeds and does not cater for FT derived feeds. FT derived feeds differ vastly from crude based feeds in that they essentially comprise of linear, paraffinic hydrocarbons, are free from sulphur, nitrogen, however, may contain traces of catalyst fines including cobalt and aluminium (alumina).

Prior art methods involve the filtering of feeds through various types of filter media. Particles down to about 1 micron can be removed, however, using large filter surfaces and with frequent replacement of filter media. The latter is undesirable for continuous processing since small pore filters are prone to irreversible plugging.

Prior art technologies have been found to be unsuitable for the removal of catalyst ultra fines and portions of soluble catalyst metals.

SUMMARY OF THE INVENTION

According to the invention there is provided a process for the removal of catalyst particles from a hydrocarbon stream derived from the reaction of synthesis gas with a particulate Fischer Tropsch catalyst in a Fischer Tropsch reactor; the process including:

1) a primary separation step which makes use of a filter, wherein the filter has a pore size which is 70% to 95%, preferably 80% to 95%, more preferably 90% to 95% of the average size of the particles of the Fischer Tropsch catalyst, thereby forming a primary filtered hydrocarbon stream containing fine catalyst particles; and
2) a secondary separation step which removes fine catalyst particles from the primary filtered hydrocarbon stream to provide a stream containing the catalyst fines, and stream containing a hydrocarbon product.

The primary separation step may take place internally within the Fischer-Tropsch reactor, or externally of the Fischer Tropsch reactor.

Preferably, the primary filtration step takes place internally within the Fischer Tropsch reactor. Typically, the primary filtration step takes place in a primary filter located internally within the Fischer Tropsch reactor from the middle to the top 75% (by height) of the reactor, preferably located at the middle (by height) of the Fischer Tropsch reactor.

The secondary filtration step preferably takes place across the porous membrane of a cross-flow filtration unit.

The porous membrane of the cross-flow filtration unit preferably has nominal a pore size of less than 1 micron, typically 70 nm or less, preferably 50 nm or less, most preferably 40 nm.

A fraction of the hydrocarbon product from the secondary separation step may be recycled to the Fischer Tropsch reactor.

Catalyst fines may be recovered from the retenate from the secondary filtration step and recycled to recover metal content.

BRIEF DESCRIPTION OF THE DRAWINGS

The Drawing is a process flow diagram of an embodiment of the invention for the removal of catalyst from a hydrocarbon stream derived from a Fischer Tropsch reaction.

DESCRIPTION OF PREFERRED EMBODIMENTS

Referring to the Drawing, a Fischer Tropsch Slurry Bubble Column Reactor (SBCR) 10 is supplied with synthesis gas 12. In an embodiment of the invention the reactor 10 is charged with a catalyst comprising cobalt supported on alumina. Such catalysts are described in detail in WO 2006/010936 and U.S. Pat. No. 4,880,763. The catalyst particles are suspended in a wax and the synthesis gas is bubbled through the reactor 10 to react with the catalyst to provide a hydrocarbon product stream 14. The wax in the reactor 10 may be at a temperature of 200 to 250° C., typically 220 to 235° C. The hydrocarbon product 14 is passed through a primary separator 16. The primary separator 16 may be located internally within the reactor 10, or externally of the reactor 10. In a preferred embodiment of the invention, the separator 16 is located internally within the reactor 10. The primary filter when placed internally in the reactor 10 may be placed from the middle to the top 75% (by height) of the reactor, more preferably it should be placed in the middle (by height) of the reactor 10. The primary separator 16 may be a filter such as a sintered metal mesh or a filter constructed from fine-woven steel wire mesh. In accordance with the present invention, said filter has a pore size which is 70% to 95%, preferably 80% to 95%, more preferably 90% to 95% smaller than the average size of the FT catalyst particles in the reactor 10 (as measured by laser diffraction). In an embodiment of the invention, the FT catalyst has an average particle size of 75 microns, and said filter (such as a Pall Rigimesh™ filter) has a pore size of 70 microns (93% of the average particle size of the Fischer-Tropsch catalyst particles). The benefit of this selection of filter pore size is that it mitigates fines build-up on the filter of the primary separator 16. This results in a porous filter cake that is more permeable to wax flow. Such a filter cake containing a limited amount of fines is more readily maintained by back-flushing to remove the catalyst cake during back-flushing cycles.

A primary filtered hydrocarbon stream 18 from the primary separator 16 is then passed to a secondary separator 20 to remove the remaining catalyst fines from the stream 18. In accordance with a preferred embodiment of the invention the secondary separator is a cross-flow filtration unit.

The cross-flow filtration unit includes a tube having a porous membrane surface. Filtration may take place from the inside of the tube to the outside of the tube or from the outside of the tube to the inside of the tube (preferably from the inside of the tube to the outside of the tube) across the porous membrane surface; this while product is circulated in a parallel direction through the length of the tube. Separation of the suspended catalyst is driven by the pressure difference form the inside of the tube to the outside of the tube. This is referred to as the trans-membrane pressure and forms a key-processing variable. The porous membrane of the cross-flow filtration unit preferably has nominal a pore size of less than 0.1 micron, typically 70 nm or less, preferably 50 nm or less, most preferably 40 nm. The wax flowing through the Cross Flow Filtration Unit is at a temperature of 200 to 250° C., typically 220 to 235° C.; and at a trans-membrane pressure of 5-45 psig.

Catalyst fouling of the porous membrane pore openings is managed by the turbulence within the cross-flow tube whereby an environment is created whereby surface filter cake is not prone to build up due to high boundary layer turbulence. Catalyst fines that would otherwise buildup at or in close proximity of the surface of the membrane are continually swept away by the high velocity stream.

The technique of cross-flow filtration can be divided into the following parts:

Liquid wax feed penetrating the membrane tubes

Wax passing through the porous membrane surface, now termed the permeate

The waxy solution laden with catalyst fines are retained by the membrane surface while high in-tube velocities keep the membrane surface free of catalyst build up. This stream now called the retenate, is similar the original stream only that the fines content has increased. The retenate is typically recycled through the membrane.

Retenate with high catalyst concentrations can be discharged after a number of cycles through the membrane.

Occasional back-flushing could be implemented should the surface need to be regenerated.

A permeate 22 in the form of a hydrocarbon stream from which fine catalyst particles have been removed (typically containing less than 2 ppm catalyst fines) and which is tolerable for downstream processes such as hydrocracking is obtained from the secondary separator 20. Catalyst fines in a retenate 24 from the cross-flow filtration unit 20 may be recycled in the cross-flow filtration unit 20, or may be returned to the reactor 10 and/or recovered by other means such as centrifugation or pressure leaf filtration. Recovered catalyst fines will typically be recycled to recover the metal content.

The particle size distribution (psd) of the catalyst plays a major role in the performance of the primary filtration system 16. Preferably, catalyst particles below 10-25 micron should be constantly removed from the reactor 10. The amount of wax (catalyst-containing) removed from the reactor 10 is directly proportional to the amount of catalyst fines that can be removed. After a set period, catalyst fines build-up causes the amount of wax to be removed from the reactor to decrease resulting in less fines removal. This could lead to reactor downtime in order to either clean-out filters or replacement of the filters or more severely having to replace the whole catalyst batch. This problem may be addressed by recycling a fraction 26 of the product stream 22 obtained from the secondary separator 20 back to the reactor 10 in order to increase the amount of wax to be filtered by the primary separator 16. This will increase the purge of catalyst fines from the reactor 10.

Optionally, an intermediate separator such as a centrifuge may be provided between the primary 16 and secondary 20 separators, to lessen the load on the secondary separator 20.

EXAMPLE

Laboratory Trials were Performed to Simulate:

A SBCR was charged with a catalyst comprising of cobalt supported on alumina (average particle size 75 microns as measured by laser diffraction) and operated on a continuous basis. The art of making such catalysts is well described in WO 2006/010936 A1 and U.S. Pat. No. 4,880,763.

Excessive wax was removed from the SBCR by filtering through a series of 70-micron pore size Pall Rigimesh™ filters placed within the SBCR. The filtration temperature during wax removal was 235° C. This step is referred to as the primary filtration step.

The density of the wax was 690 kg/m$^3$ and the viscosity 0.55 cP, and contained 89 ppm cobalt per kg wax and 167 ppm aluminum per kg wax, the wax was gray in colour. The wax product composition was distributed between $C_{10}$ and $C_{60}$. Carbon number 21 was the highest concentration of all the hydrocarbon carbon numbers. A portion of 50% particles present in the wax was below 10 microns in size while a portion of while a portion of 37% was below 5 microns.

The wax was subjected to cross flow filtration. This process is described in U.S. Pat. No. 6,762,209.

A membrane module was constructed using a Pall Inc, AccuSep™ stainless steel membrane coated with a proprietary sub micron coating to give a nominal pore size of 70 nm. The single membrane had an ID of 0.4" and was 45" long yielding 0.388 ft$^2$ of membrane surface area. The membrane had an inlet port (filtrate) and outlet (retenate) ports with ½" tubing ends, and a permeate port located at the midpoint of the unit.

A portion of wax 195 L was heated to the operation temperature of 200° C. in a mixing tank and maintained there for the duration of the test. Filtration piping and product lines were heat traced to just above 200° C. Product was pumped via a progressive cavity type pump able to pump up to 40 L/min at a pressure of 35 psig.

Operation conditions were set at:

| | |
|---|---|
| Operating temperature | 200° C. |
| Circulation flow rate | 5.4 Gallons per minute (20.4 L/minute) |
| Trans membrane pressure | 5-45 psig |

Note:
the Trans membrane pressure is the pressure differential across the inlet of the membrane tube and the outlet of the membrane.

Permeate was recycled back to the feed tank to simulate continuous filtration.

Of the 195 L of wax a portion of 153 L clarified permeate was produced with <2 ppm cobalt and <0.1 ppm aluminum.

At a trans-membrane pressure of 45 psig a flux of 280 GFD (1060 L/day) was achieved for the single membrane tested.

A volume concentration factor of greater that 4.7 was achieved during the trial.

The catalyst rejection rate or the portion retained by the membrane was greater than 99%.

1 psi=6894.757 Pa 1 inch=2.54×10⁻² m 1 ft=3.048×10⁻¹ m

The invention claimed is:

1. A process for the removal of catalyst particles from a hydrocarbon stream derived from the reaction of synthesis gas with a particulate Fischer Tropsch catalyst in a Fischer Tropsch reactor; the process including:
   1) passing the hydrocarbon stream to a primary separation step comprising a filter, wherein the filter has a pore size which is 70% to 95% of the average size of the particles of the Fischer Tropsch catalyst, thereby forming a primary filtered hydrocarbon stream containing fine catalyst particles; and
   2) passing the primary filtered hydrocarbon stream containing fine catalyst particles to a secondary separation step to remove fine catalyst particles from the primary filtered hydrocarbon stream to provide a stream containing the catalyst fines, and stream containing a hydrocarbon product.

2. The process as claimed in claim 1, wherein the filter pore size of the primary filter is 80% to 95% of the average size of the particles of the Fischer Tropsch catalyst.

3. The process as claimed in claim 2, wherein the filter pore size of the primary filter is 90% to 95% of the average size of the particles of the Fischer Tropsch catalyst.

4. The process as claimed in claim 1, wherein the primary filtration step takes place internally within the Fischer Tropsch reactor.

5. The process as claimed in claim 4, wherein the primary filtration step takes place in a primary filter located internally within the Fischer Tropsch reactor at a position from the middle to the top 75% (by height) of the Fischer Tropsch reactor.

6. The process as claimed in claim 5, wherein the primary filter is located at the middle (by height) of the Fischer Tropsch reactor.

7. The process as claimed in claim 1, wherein the secondary filtration step takes place across the porous membrane of a cross-flow filtration unit.

8. The process as claimed in claim 7, wherein the porous membrane of the cross-flow filtration unit has nominal a pore size of less than 1 micron.

9. The process as claimed in claim 8, wherein the porous membrane of the cross-flow filtration unit has nominal a pore size of 70 nm or less.

10. The process as claimed in claim 9, wherein the porous membrane of the cross-flow filtration unit has nominal a pore size of 50 nm or less.

11. The process as claimed in claim 10, wherein the porous membrane of the cross-flow filtration unit has nominal a pore size of 40 nm.

12. The process as claimed in claim 1, wherein a fraction of the hydrocarbon product from the secondary separation step is recycled to the Fischer Tropsch reactor.

13. The process as claimed in claim 1, wherein catalyst fines recovered from the retenate from the secondary filtration step are recycled to recover metal content.

* * * * *